(12) United States Patent
Wilson

(10) Patent No.: US 9,560,023 B2
(45) Date of Patent: Jan. 31, 2017

(54) SYSTEMS AND METHODS FOR PROTECTING INTERNET ADVERTISING DATA

(71) Applicant: AOL Inc., Dulles, VA (US)

(72) Inventor: Jeffrey Todd Wilson, Ashburn, VA (US)

(73) Assignee: AOL, Inc., Dulles, VA (US)

( * ) Notice: Subject to any disclaimer, the term of this patent is extended or adjusted under 35 U.S.C. 154(b) by 0 days.

(21) Appl. No.: 14/518,111

(22) Filed: Oct. 20, 2014

(65) Prior Publication Data

US 2016/0050188 A1    Feb. 18, 2016

Related U.S. Application Data

(60) Provisional application No. 62/036,996, filed on Aug. 13, 2014.

(51) Int. Cl.
*H04L 9/12*     (2006.01)
*H04L 29/06*    (2006.01)
*G06Q 30/02*    (2012.01)
*G06F 21/62*    (2013.01)

(52) U.S. Cl.
CPC ....... *H04L 63/0435* (2013.01); *G06Q 30/0269* (2013.01); *H04L 63/0428* (2013.01); *H04L 63/061* (2013.01)

(58) Field of Classification Search
CPC ............... G06F 17/30035; G06F 17/30702; G06Q 30/0269
See application file for complete search history.

(56) References Cited

U.S. PATENT DOCUMENTS

| | | | |
|---|---|---|---|
| 6,029,195 A * | 2/2000 | Herz | G06F 17/30867 348/E7.056 |
| 2001/0013037 A1 * | 8/2001 | Matsumoto | G06F 17/30867 |
| 2006/0271425 A1 * | 11/2006 | Goodman | G06Q 30/02 705/14.58 |
| 2010/0169224 A1 * | 7/2010 | Ramberg | G06Q 10/06375 705/71 |
| 2011/0167003 A1 | 7/2011 | Nice et al. | |

(Continued)

OTHER PUBLICATIONS

European Search Report in EP 151800581.9, dated Dec. 16, 2015.

*Primary Examiner* — Venkat Perungavoor
(74) *Attorney, Agent, or Firm* — Bookoff McAndrews, PLLC

(57) ABSTRACT

Systems and methods are disclosed for protecting user privacy in, for example, online advertising environments. The method includes receiving data related to a user in a first communication session between a host server and a client device, and generating a user profile associated with the user. The method further may include encrypting the user profile to produce encrypted user profile data and generating a decryption key for decrypting the encrypted user profile data. Thereafter, either the decryption key or a portion of the encrypted user profile data may be transmitted to the client device and then deleted from host server before ending the first communication session. The method further may include establishing a second communication session between the host server and the client device and retrieving the transmitted content. Then targeted advertising may be provided by decrypting the encrypted user profile data.

18 Claims, 6 Drawing Sheets

(56) References Cited

U.S. PATENT DOCUMENTS

2013/0080242 A1\* 3/2013 Alhadeff ............ G06Q 30/0217
705/14.39
2014/0188626 A1 7/2014 Biswas
2014/0372224 A1\* 12/2014 Tawakol ............ G06Q 30/0269
705/14.66

\* cited by examiner

SYSTEMS AND METHODS FOR PROTECTING INTERNET ADVERTISING DATA

PRIORITY

This application claims the benefit of priority from Provisional Application No. 62/036,996, filed Aug. 13, 2014, which is hereby incorporated herein by reference in its entirety

TECHNICAL FIELD

The present disclosure relates generally to electronic and online user privacy techniques and related systems and methods. More particularly, and without limitation, the present disclosure relates to systems and methods for protecting user privacy in, for example, online advertising environments.

BACKGROUND

Due to the vast and increasing amount of traffic generated by users on the Internet, businesses continue to seek more effective means to advertise their goods and services online. In recent years, the online advertising environment has evolved to enable the use of user profiles for providing targeted advertising. Such user profiles may provide insight into a user's habits, personality, shopping trends, in addition to various other details about an individual's life.

One major privacy concern and criticism of interest-based advertising is that data that is collected and used to build user profiles and interest segments may be easily accessed or perused by government entities or malicious parties. For example, there have been numerous recent public revelations regarding the easy access that is provided to aggregated user data by some of the largest social media platforms. Implementing targeted ad campaigns involves the audience intelligence providers gathering and processing information about users, which is known as "profiling." One way intelligence providers gather user information is by tracking users as they surf the Internet by using Internet "cookies." Generally, a cookie is a small piece of data placed on the user's browser when the user visits a website belonging to an ad network. The cookie usually contains, among other things, a unique identifier associated with the user. Depending on the practices of the ad network, the cookie may contain other information, such as date and time information, an estimated zip code of the user, and browser history information. The cookie is stored for a specified time and returned whenever the user subsequently visits that website or another website in the ad network. By compiling and analyzing cookie information associated with a particular user gathered across multiple websites, a "user profile" indicating various attributes, preferences, and/or interests of the user can be built. This profile may then be used by ad networks and/or ad exchanges to support targeted ad campaigns. Of course, other user tracking methods may be used by intelligence providers to gather information about users and to build user profiles.

Recent improvements in data correlation techniques have allowed third parties, such as data brokers and other audience intelligence providers, to link multiple user profiles together, and even to discover real-world user identity information. As a result, sensitive information about an individual may be discovered and misused. Many users are unaware that personal data is being collected from their device and sold to third parties. Some people find such user tracking and profiling methods employed by online advertisers to be intrusive or invasive, but find "opting-out" to be difficult.

Monetizing data regarding users is important for the ability to provide online content that is inexpensive from the user's standpoint. However, to maintain user loyalty and usage, privacy concerns have to be addressed. Embodiments of the current disclosure involve protecting user data from wholesale harvesting by government entities and would-be attackers, without reducing utility in the data and without significantly impacting performance in delivery of content to users.

SUMMARY

Various embodiments of the present disclosure relate generally to improving methods for enhancing security of user data in advertising environments. Each of the embodiments disclosed herein may include one or more of the features described in connection with any of the other disclosed embodiments.

According to some embodiments, computer-implemented methods are disclosed for protecting user privacy in an online advertising environment. In an exemplary method, the method includes receiving, at a host server, data related to user in a first communication session between the host server and a client device, and generating or receiving, at the host server, a user profile associated with a user, and encrypting the user profile to produce encrypted user profile data and generating a decryption key for decrypting the encrypted user profile data. The method may further include transmitting the decryption key to the client device, deleting the decryption key from the host server, and ending the first communication session, establishing a second communication session between the host server and the client device, receiving the decryption key from the client device in the second communication session, and providing targeted advertising based in part on decrypting the encrypted user profile data.

According to some embodiments, computer-implemented methods are disclosed for protecting user privacy in an online advertising environment. In an exemplary method, the method includes receiving, at a host server, data related to user in a first communication session between the host server and a client device, and generating or receiving, at the host server, a user profile associated with a user, and encrypting the user profile to produce encrypted user profile data and generating a decryption key for decrypting the encrypted user profile data. The method may further include transmitting a portion of the encrypted user profile data to the client device, deleting the portion of the encrypted user profile data from the host server, and ending the first communication session, establishing a second communication session between the host server and the client device, receiving the portion of the encrypted user profile data from the client device during the second communication session, and providing targeted advertising based in part on decrypting the encrypted user profile data.

According to some embodiments, systems are disclosed for protecting user privacy in an online advertising environment. One system includes a memory having processor-readable instructions stored therein and a processor configured to access the memory and execute the processor-readable instructions, which when executed by the processor configures the processor to perform a method. In an exemplary method, the method includes receiving, at a host server, data related to user in a first communication session between the host server and a client device, and generating or receiving, at the host server, a user profile associated with a user, and encrypting the user profile to produce encrypted user profile data and generating a decryption key for decrypting the encrypted user profile data. The method may further include transmitting the decryption key to the client device, deleting the decryption key from the host server, and ending the first communication session, establishing a second communication session between the host server and the client device, receiving the decryption key from the client device in the second communication session, and providing targeted advertising based in part on decrypting the encrypted user profile data.

According to some embodiments, systems are disclosed for protecting user privacy in an online advertising environment. One system includes a memory having processor-readable instructions stored therein and a processor configured to access the memory and execute the processor-readable instructions, which when executed by the processor configures the processor to perform a method. In an exemplary method, the method includes receiving, at a host server, data related to user in a first communication session between the host server and a client device, and generating or receiving, at the host server, a user profile associated with a user, and encrypting the user profile to produce encrypted user profile data and generating a decryption key for decrypting the encrypted user profile data. The method may further include transmitting a portion of the encrypted user profile data to the client device, deleting the portion of the encrypted user profile data from the host server, and ending the first communication session, establishing a second communication session between the host server and the client device, receiving the portion of the encrypted user profile data from the client device during the second communication session, and providing targeted advertising based in part on decrypting the encrypted user profile data.

According to some embodiments, a non-transitory computer readable medium is disclosed as storing instructions that, when executed by a computer, cause the computer to perform a method, the method includes receiving, at a host server, data related to user in a first communication session between the host server and a client device, and generating or receiving, at the host server, a user profile associated with a user, and encrypting the user profile to produce encrypted user profile data and generating a decryption key for decrypting the encrypted user profile data. The method may further include transmitting the decryption key to the client device, deleting the decryption key from the host server, and ending the first communication session, establishing a second communication session between the host server and the client device, receiving the decryption key from the client device in the second communication session, and providing targeted advertising based in part on decrypting the encrypted user profile data.

According to some embodiments, a non-transitory computer readable medium is disclosed as storing instructions that, when executed by a computer, cause the computer to perform a method, the method includes receiving, at a host server, data related to user in a first communication session between the host server and a client device, and generating or receiving, at the host server, a user profile associated with a user, and encrypting the user profile to produce encrypted user profile data and generating a decryption key for decrypting the encrypted user profile data. The method may further include transmitting a portion of the encrypted user profile data to the client device, deleting the portion of the encrypted user profile data from the host server, and ending the first communication session, establishing a second communication session between the host server and the client device, receiving the portion of the encrypted user profile data from the client device during the second communication session, and providing targeted advertising based in part on decrypting the encrypted user profile data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

DETAILED DESCRIPTION

Figure 1:
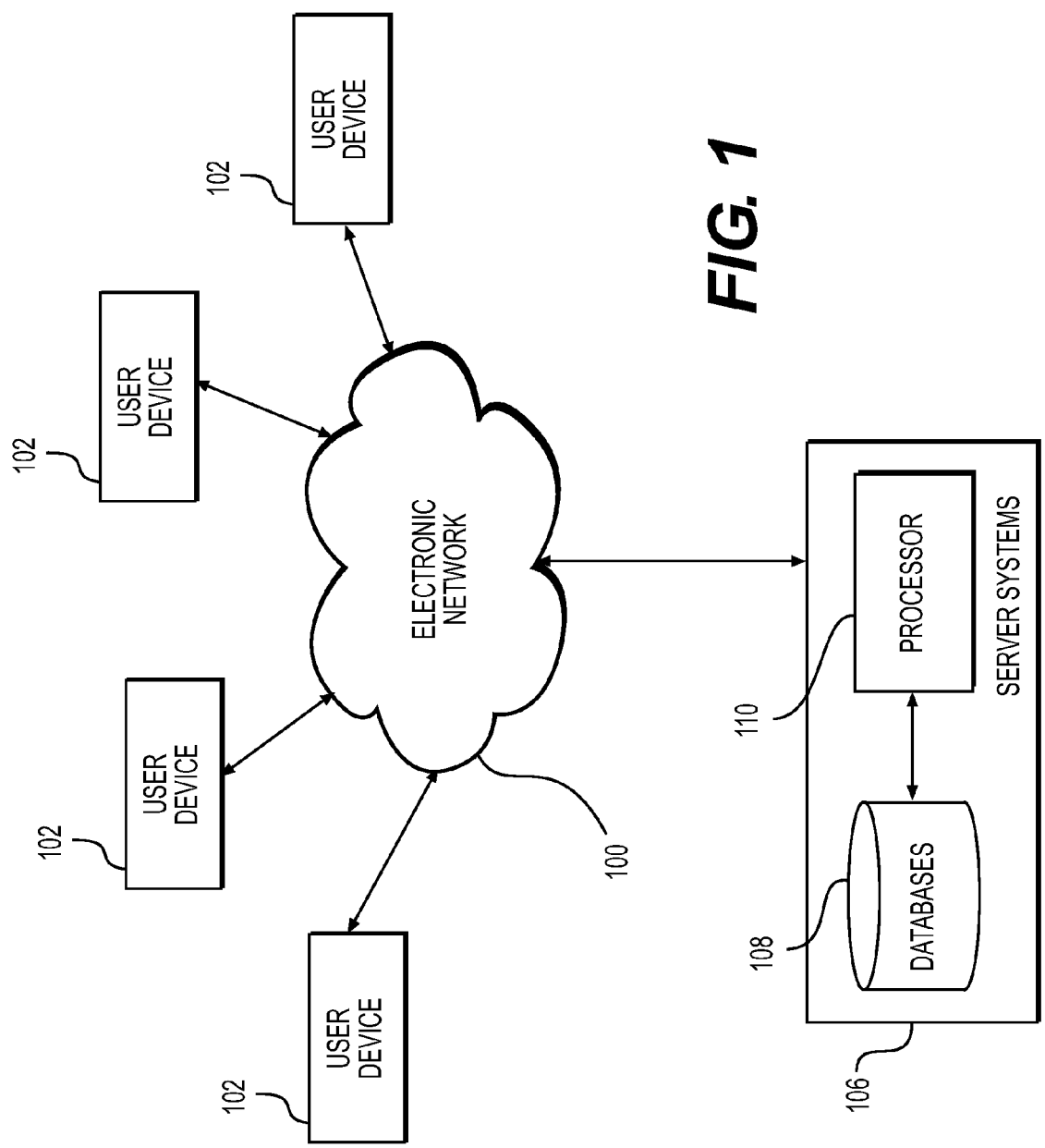
FIG. 1 shows a block diagram of an exemplary online advertising environment for providing consumer privacy, consistent with exemplary embodiments.

The present disclosure describes systems and methods for protecting the identity of a user in online advertising environment. While principles of the current disclosure are described with reference to online advertising, it should be understood that the disclosure is not limited thereto. Rather, the systems and methods of the present disclosure may be used in any networked system to provide identity protection.

In an exemplary embodiment, when a user visits the web page of a publisher, the instance of the publisher web page executing in the user's browser generate a request for ads to fill any available ad space on the page. Based on an identity of a user, the user's profile, context, current location, and/or an interest score assigned to the user, targeted advertising may be provided for a user. In some embodiments, an interest score may be generated the first time that an advertising server interacts with a new user. Additionally, a unique Id cookie may be created and provided to the client device. Thereafter, based on any additional interactions with a user, the interest scores may periodically be updated. The interest scores and/or a user profile generated based on user behavior may enable an ad network and/or ad exchange to select and serve a targeted ad for displaying an advertisement on a user's browser based on a target audience selected based on that interest score and/or user profile.

Embodiments consistent with the present disclosure aid in protecting user privacy, such as protecting user profile data including interest scores in online advertising environments. In one embodiment, one of both of two separate approaches may be taken for ensuring that sensitive user targeting data is encrypted and accessible only when a client device is communicating with an advertising server. In both of the approaches, user profile data may be created, encrypted, and then stored so that it is accessible only in real time, for example, when targeted advertising is requested. As discussed above, user profile data may be indicative of a user's preferences and/or predicted responsiveness to particular advertising content. In a first approach, when the user profile data is encrypted, a decryption key may be transmitted to a client device (or client server) and stored therein, so that the user profile data may be decrypted only when the client and a host server are connected. In a second approach, the decryption key may remain stored at the host server but part of the encrypted user profile data is stored only at the client device (or client server). Accordingly, in this exemplary scenario, the host and client must be connected for any decryption to occur. Accordingly, both of these exemplary approaches provide an advantage that the host server (hosting entity) is unable to decrypt encrypted user profile data on its own without connecting with a client device, thereby allowing for preservation of data privacy.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a schematic diagram of an exemplary network environment in which various user interfaces may display online content, according to an embodiment of the present disclosure. As shown in FIG. 1, the environment may include a plurality of user or client devices 102 that are communicatively coupled to each other as well as a plurality of server systems 106 via an electronic network 100. Electronic network 100 may include one or a combination of wired and/or wireless electronic networks. Network 100 may also include a local area network, a medium area network, or a wide area network, such as the Internet.

In one embodiment, each of user or client devices 102 may be any type of computing device configured to send and receive different types of content and data to and from various computing devices via network 100. Examples of such a computing device include, but are not limited to, a desktop computer or workstation, a laptop computer, a mobile handset, a personal digital assistant (PDA), a cellular telephone, a network appliance, a camera, a smart phone, an enhanced general packet radio service (EGPRS) mobile phone, a media player, a navigation device, a game console, a set-top box, or any combination of these or other types of computing devices having at least one processor, a local memory, a display (e.g., a monitor or touchscreen display), one or more user input devices, and a network communication interface. The user input device(s) may include any type or combination of input/output devices, such as a keyboard, touchpad, mouse, touchscreen, camera, and/or microphone.

In one embodiment, each of the user or client devices 102 may be configured to execute a web browser or mobile browser, TV set-top box, or other software application capable of communicating across a network (such as a mobile application) installed for displaying various types of content and data received from any of server systems 106 via network 100. Server systems 106 in turn may be configured to receive data related to user interaction with the web browsers or mobile browsers, TV set-top boxes/programming, or other client software displayed in the user or client devices 102. The user interaction may occur at each device 102 through an interface provided on a web page loaded within the browser executable or user interface at each device. It should be noted that server systems 106 may be implemented using a single server device or system or may refer to a combination of multiple servers. Additionally, server systems 106 may contain one or more additional servers, such as an advertising server (not illustrated) and interest scoring server (not illustrated).

An exemplary advertising server may be configured to receive a request to fill any available ad space on a web page of a publisher with the instance of the publisher web page or user interface executing in the user's browser, TV set-top box, or other client software generating the request. The advertising server may also determine whether a particular user is the target audience for a particular advertisement. An interest scoring server may comprise an interest scoring system, which provides a score to each individual user based on likely interest in various advertising offers and subject matters. An exemplary interest scoring system receives a request with a unique identifier, and subsequently checks to see if there is any existing information in the system for that identifier. If no data related to a particular identifier is included, then new data may be created for the unique identify. The data reflects a user's online or offline activities and/or their user profile. A score may be assigned to such online activities and/or their user profile and may be stored by the exemplary interest scoring system. If previous data related to a unique identity, previously existed, than the previous data is updated.

Server systems 106 may also be configured to encrypt and decrypt data associated with a user including user profile data. Further details with respect to encryption and decryption are provided in the explanation accompanying FIGS. 2-5B.

As shown in FIG. 1, server systems 106 may include processor 110. In an embodiment, processor 110 may be configured to execute a process for protecting user privacy in an advertising environment, as will be described in further detail below with respect to FIGS. 2-5B. In one embodiment, optimizing processor 110 may be configured to receive instructions and content from various sources including user or client devices 102 and to store the received content within databases 108. In an embodiment, databases 108 may be any type of data store or recording medium that may be used to store any type of data. For example, databases 108 may store demographic and metrics of target audiences for advertising, user profile data, advertising content, encrypted data, decrypted data, user-generated content, online and offline activity, location data, etc. Databases 108 may also store information related to the target audience, individual user profiles, encrypted data, and decrypted data. In some implementations, data may be stored in the databases 108 in an encrypted form to increase security of the data against unauthorized access. Processor 110 or any additional processors within server systems 106 may also be configured to provide content to client or user devices 102 for display. The displayed content may include, for example, any online content that has been processed or received with embedded advertising content. For example, processor 110 may transmit web page content including targeted advertising. In some embodiments, client devices 102 may be used by certain users to input or manage content that is managed by processor 110. For example, specific metrics regarding what kind of targeted advertising may be provided, accessed, and/or controlled by an advertising entity using one of the user or client devices 102.

Figure 2:
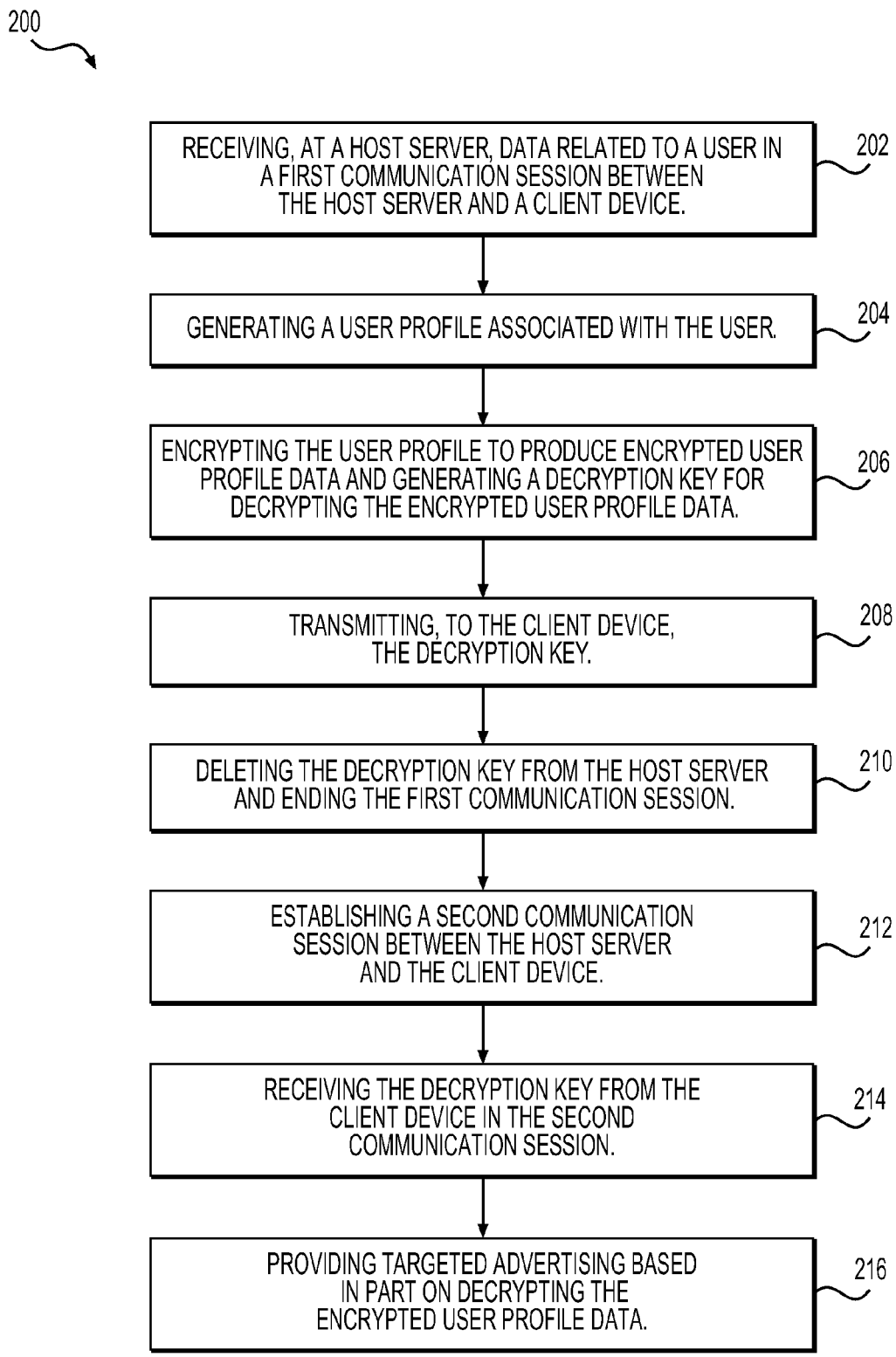
FIG. 2 is a flow diagram of an exemplary method for protecting user privacy in an online advertising environment, according to an embodiment of the present disclosure.

FIG. 2 is a flow diagram of a method 200 for protecting user privacy in an online advertising environment, according to an exemplary embodiment of the present disclosure. In further detail, as shown in FIG. 2, step 202 of method 200 may include receiving, at a host server, data related to a user in a first communication session between the host server and a client device. Specifically, server systems 106 (or vice-versa) may establish a first communication session with one of user devices 102. The session may be authenticated using any desired methods. During the first session, data related to a user associated with user device 102 may include but is not limited to device identity associated with a user, demographic data, user behavior, user preferences, etc. For example, user preference data may be gathered by websites affiliated with ad networks and/or general browsing behavior. Additional data may be captured including exposure to broadcast content, for example, tracking of broadcast content via a television set-top box, podcast-capable device, or other internet-based broadcast. Furthermore, precise location data and behavioral data may be collected and/or discerned from mobile devices and/or interactions with physical beacons in various locations such as related stored. Devices at a location may be determine an identify of a user or determine device identity through device characteristics (e.g., wireless or Bluetooth emissions), voice or image recognition data collected through mobile device or in-store cameras and beacons, and using in-vehicle data collection appliances or software (e.g. navigation systems or onboard network connected computers). The data may further include additional offline activity, data related to a user's purchasing behavior, and data shared by additional data aggregators, Step 204 of method 200 may include generating or receiving a user profile associated with the user. For example, a user profile may be generated within server systems 106 based on the received data that is associated with the user. In some embodiments, server systems 106 may also retrieve data from additional sources within environment 100 which may provide additional information for generation of a user profile in addition to the received data. This may include demographic information, general population patterns, specific personal data of the user associated with a client device, etc. Therefore, an exemplary user profile may be based on user behavior along with any additional data that may be available regarding the user (for example, demographic information) associated with user device 102.

In some embodiments, an interest score may be generated and serve as a user profile associated with a user. The interest score may be determined for a user based on the received data and any previously stored data. As discussed above, the interest score may be indicative of a user's behavior and/or personality.

In embodiments, a user profile and interest score may be based on any activity performed via an electronic device or under the observation of an electronic device. Accordingly, the electronic device may collect data related to the activity and may use it for generating a user profile and/or interest score. The various activities may include, but are not limited to, viewing a TV program via a set-top box, interacting with a web browser or mobile/tablet application, driving or riding a network-connected vehicle, purchasing goods or services via electronic payment methods, such as, credit cards, mobile devices, shopping in a store with a video camera/system capable of facial recognition, carrying a mobile device that broadcasts user/device specific details in or near an establishment or other devices capable of discerning such details, etc., and interacting with physical kiosks that can discern identity or uniqueness.

Figure 3B:
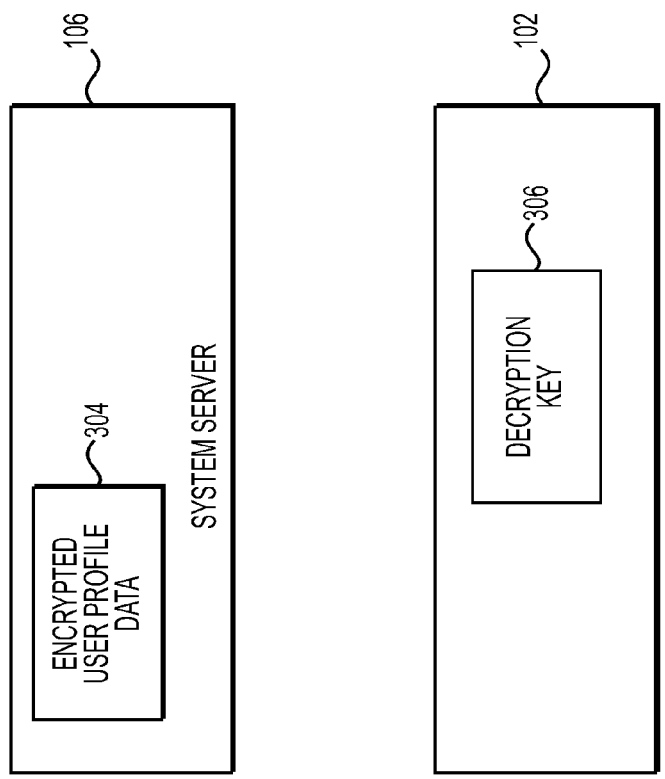
FIGS. 3A and 3B are schematics of an exemplary scenario for protecting user privacy, according to an embodiment of the present disclosure.
Figure 3A:
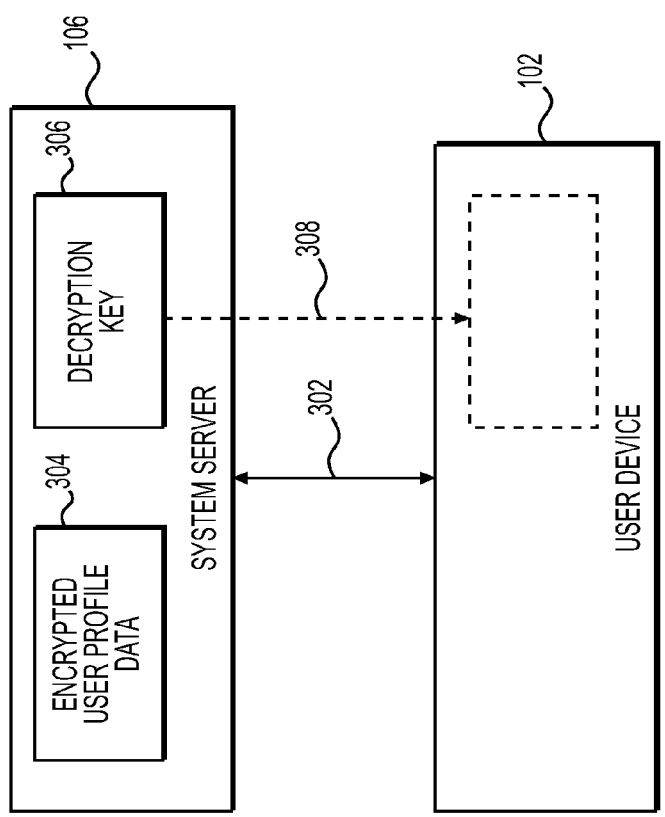

Step 206 of method 200 may include encrypting the user profile to produce encrypted user profile data and generating a decryption key for decrypting the encrypted user profile data. The user profile may be encrypted to produce encrypted user profile data using any desired methods. Accordingly, information related to a user may be stored in a secure manner by encrypting the data, where a decryption key is used to decrypt this data in a fast manner. For example, FIG. 3A illustrates an exemplary scenario in which a user profile is generated. Connection 302 between server systems 106 and user device 102 represents a first communication session. Encrypted user profile data 304 based on a user profile associated with a user may be stored within server systems 106 along with a corresponding decryption key 306 that may be used to decrypt the encrypted user profile data 304.

Step 208 of method 200 may include transmitting, to the client device, the decryption key. For example, server systems 106 may transmit the decryption key associated with the encrypted user profile data to client device 102. In embodiments, easy decryption of encrypted user profile data involves access to the decryption key. Continuing the example from before, transmission 308 represents transmission of the decryption key 306 from server systems 106 to user device 102.

Step 210 of method 200 may include deleting the decryption key from the host server and ending the first communication session. For example, the decryption key may be affirmatively deleted from server systems 106 and all other elements of environment 100, except a copy that is retained at user device 102 associated with the user. Additionally, the communication session between user device 102 and server systems 106 may be closed or ended so that they are no longer in communication with each other. Continuing the example from before, FIG. 3B represents an exemplary scenario after a transmission of decryption key 306 from server systems 106 to user device 102 has occurred and connection 302 has ended. Furthermore, in this exemplary scenario, a copy of decryption key 306 is stored only within user device 102 and all other copies from server systems 106 or other elements of environment 100 have been deleted. Accordingly, even if an entity were able to access the encrypted user profile data 304 within server systems 106, the entity would have no easy approach to decrypt the data without access to user device 102. Since user device 102 is not connected to server systems 106, user data security is considerably enhanced.

Step 212 of method 200 may include establishing a second communication session between the host server and the client device. Specifically, server systems 106 (or vice-versa) may establish a second communication session with one of user devices 102. The session may be authenticated using known methods in the art.

Step 214 of method 200 may include receiving the decryption key from the client device in the second communication session. For example, whenever a connection session between server systems 106 and user device 102 is established, any decryption keys related to the user device 102 (associated user) may be automatically transmitted from user device 102 to server systems 106. Alternatively, server systems 106 may request specific decryption keys from user device 102 and, responsive to said request, user device 102 may transmit the decryption key to server systems 106.

In embodiments, a user may be provided a notification which may allow them to select not to transmit the decryption key. For example a user may be able to provide consent or explicitly deny key transmission under circumstances, such as, making a selection to not transmit the decryption key from the client device when engaged in private browsing.

Step 216 of method 200 may include providing targeted advertising based in part on decrypting the encrypted user profile data. In detail, using the received (or retrieved) decryption key, encrypted user profile data may be decrypted for re-generating and/or accessing the user profile. An advertising entity may provide data related to a targeted audience for advertising content. Then, the user profile of a user associated with a particular client device may be used to determine which advertisements should be provided to the user. For example, demographics of targeted potential customers may be compared with a user profile associated with a user and, based on the similarity, targeted advertising may be provided.

Accordingly, exemplary method 200 aids in enhancing protection of encrypted data by storing associated decryption keys in a different physical location than the encrypted user profiles. Furthermore, security is enhanced since the decryption keys are not accessible unless a communication session is established between server systems 106 (host server) and user device 102. Accordingly, an entity which is able to gain access to encrypted data stored in systems servers 106 would have to go through a tedious and/or illegal process to decrypt any accessed (or stolen) data without access to the decryption keys.

In embodiments, in each subsequent connected session between server systems 106 and user device 102, previously stored encrypted user profile data may be decrypted and may be updated to generate an updated user profile. The updated user profile may then be encrypted and the associated decryption key may then be transferred to user device 102 and deleted from server systems 106. Therefore, in each subsequent session, the user profile may be easily accessed and updated. However, data privacy is enhanced since, for access of a user profile and/or to update the user profile, a connection session between a client device and the host server must be established. Further, decryption keys may be further updated with each interaction or data update, continually enhancing security. Once any data within server systems 106 is updated, a new decryption key may be generated, and the key may be transmitted to user device 102 and deleted from server systems 106.

Figure 4:
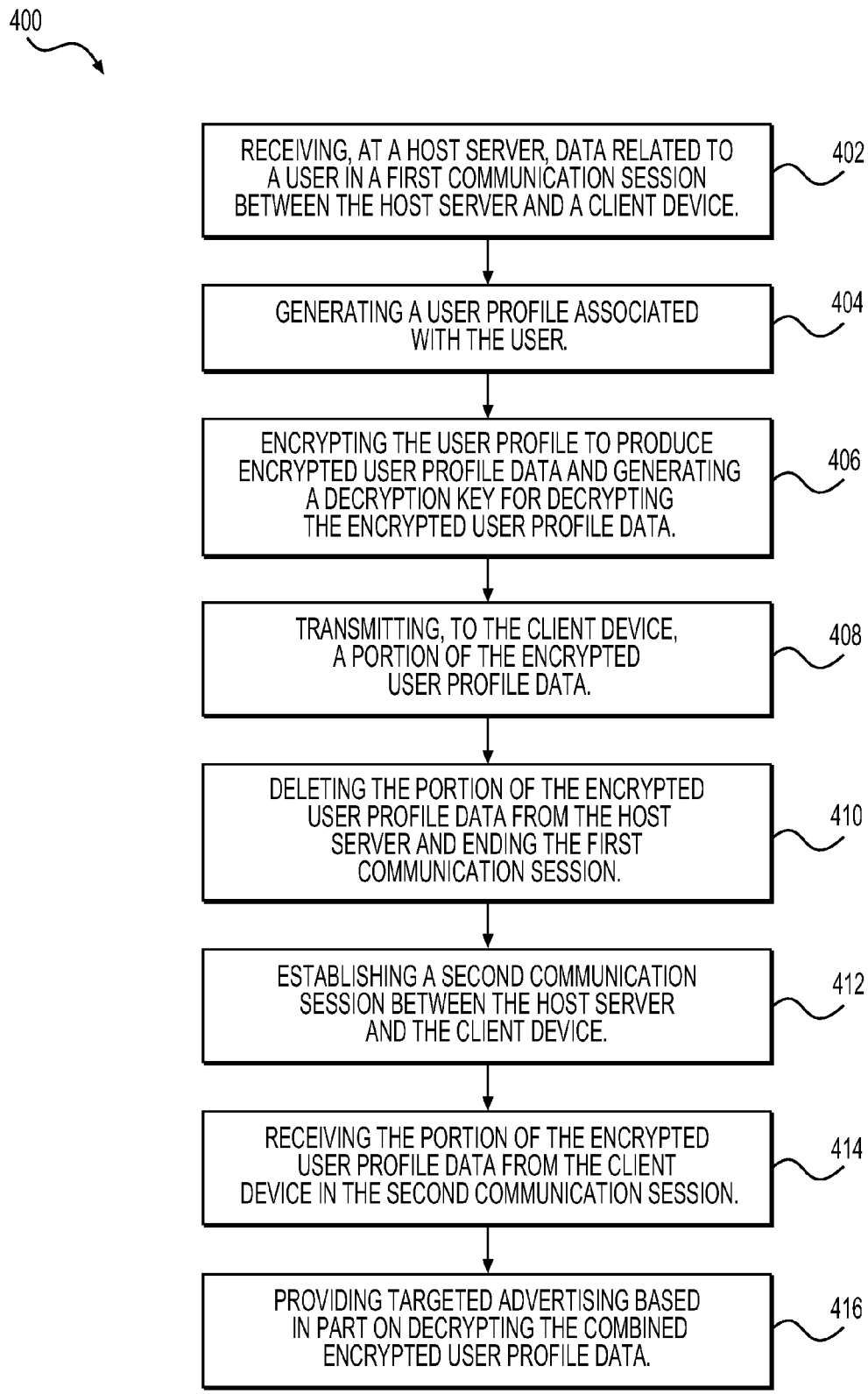
FIG. 4 is a flow diagram of another exemplary method for protecting user privacy in an online advertising environment, according to an embodiment of the present disclosure.
Figure 5:
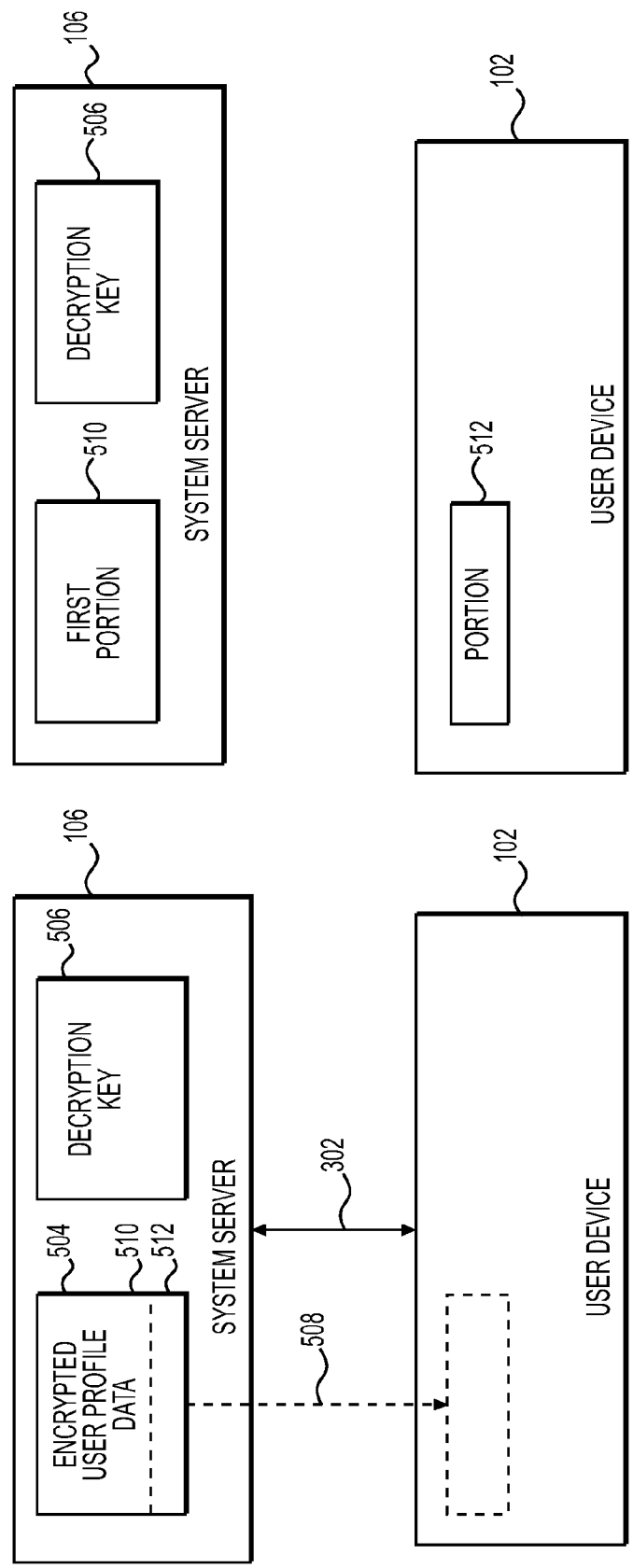
FIGS. 5A and 5B are schematics of an exemplary scenario for protecting user privacy, according to an embodiment of the present disclosure.

FIG. 4 is a flow diagram of a method 400 for protecting user privacy in an online advertising environment, according to another embodiment of the present disclosure. In an exemplary embodiment, step 402 may include receiving, at a host server, data related to a user in a first communication session between the host server and a client device. In an exemplary embodiment, step 402 may be performed similarly to step 202 of method 200.

Step 404 of method 400 may include generating or receiving a user profile associated with the user. In an exemplary embodiment, step 404 may be performed similar to method 204 of step 200.

Step 406 of method 400 may include encrypting the user profile to produce encrypted user profile data, and generating a decryption key for decrypting the encrypted user profile data. In an exemplary embodiment, step 406 may be performed similar to method 206 of method 200. For example, FIG. 5A illustrates an exemplary scenario in which a user profile is generated. Connection 502 between server systems 106 and user device 102 may represent a first communication session. Encrypted user profile data 504 may be based on a user profile associated with a user and may be stored within server systems 106 along with a corresponding decryption key 506 that may be used to decrypt the encrypted user profile data 304.

In some embodiments, encrypted user profile data may be split at least into two portions. In one embodiment, the user profile data may be divided into a large portion and a small portion. The smaller portion may be large enough to be mathematically relevant such that the remaining portion of the encrypted user profile data may not be decrypted using the decryption key without the missing portion. For example, encrypted user profile data 504 may be split into first encrypted data portion 510 and second encrypted data portion 512. Accordingly, neither of the first user first encrypted data portion 510 and the second encrypted data portion 512 may be decrypted by themselves using decryption key 506. Therefore, a user must possess complete encrypted profile data 504 (including first encrypted portion 510 and second encrypted portion 512) and decryption key 506 to decrypt any of the encrypted data.

Step 408 of method 400 may include transmitting, to the client device, a portion of the encrypted user profile data. For example, after splitting the encrypted user profile data 504 into multiple portions, server systems 106 transmit a portion of encrypted user profile data t504 o client device 102. Continuing the example from above, transmission 508 may represent transmission of second encrypted data portion 512 from server systems 106 to user device 102. Accordingly, because a portion of the encrypted user profile data is transmitted, decryption of the remaining encrypted data may not be conducted in server systems 106 by simply using the decryption key 506, as described in further detail above.

Step 410 of method 400 may include deleting the portion of the encrypted user profile data from the host server and ending the first communication session. For example, the transmitted portion of the encrypted user profile data may be affirmatively deleted from server systems 106 and all other elements of environment 100, except that it may be retained at user device 102 associated with the user. Additionally, the communication session between user device 102 and server systems 106 may be closed or ended so that they are no longer in communication with each other. Continuing the example from before, FIG. 5B represents an exemplary scenario after a transmission of second encrypted portion 512 from server systems 106 to user device 102 has occurred and connection 302 has ended. Additionally, a copy of second encrypted data portion 512 is stored only within user device 102 and all other copies from server systems 106 or other elements of environment 100 have been deleted. Accordingly, even if an entity were able to access the first encrypted data portion 510 and decryption key 506 within server systems 106, the entity would have no easy approach to decrypt the data without access to user device 102. Since user device 102 is not connected continuously to server systems 106, user data security is considerably enhanced.

Step 412 of method 400 may include establishing a second communication session between the host server and the client device. Specifically, server systems 106 (or vice-versa) may establish a second communication session with one of user devices 102. The session may be authenticated using any desired method.

Step 414 of method 400 may include receiving the portion 512 of the encrypted user profile data from the client device during the second communication session. For example, whenever a connection session between server systems 106 and user device 102 is established, any portions of the encrypted user profile data may be automatically transmitted from user device 102 to server systems 106. Alternatively, server systems 106 may request specific missing portions of the encrypted user profile data from user device 102 and, responsive to such a request, user device 102 may transmit the portion of the encrypted user profile data to server systems 106. For example, second encrypted data portion 512 may be transmitted from user device 102 to server systems 106.

Step 416 of method 400 may include providing targeted advertising based in part on decrypting the combined encrypted user profile data. In detail, by first combining the received (or retrieved) portion of encrypted data with portions of encrypted data stored within server systems 106, encrypted user profile data may be decrypted for re-generating the user profile. Thereafter, the user profile may be used similarly to step 216 of method 200 for providing targeted advertising content.

The examples described above with respect to FIGS. 1-5, or any part(s) or function(s) thereof, may be implemented using hardware, software modules, firmware, tangible computer readable media having instructions stored thereon, or a combination thereof and may be implemented in one or more computer systems or other processing systems.

Figure 6:
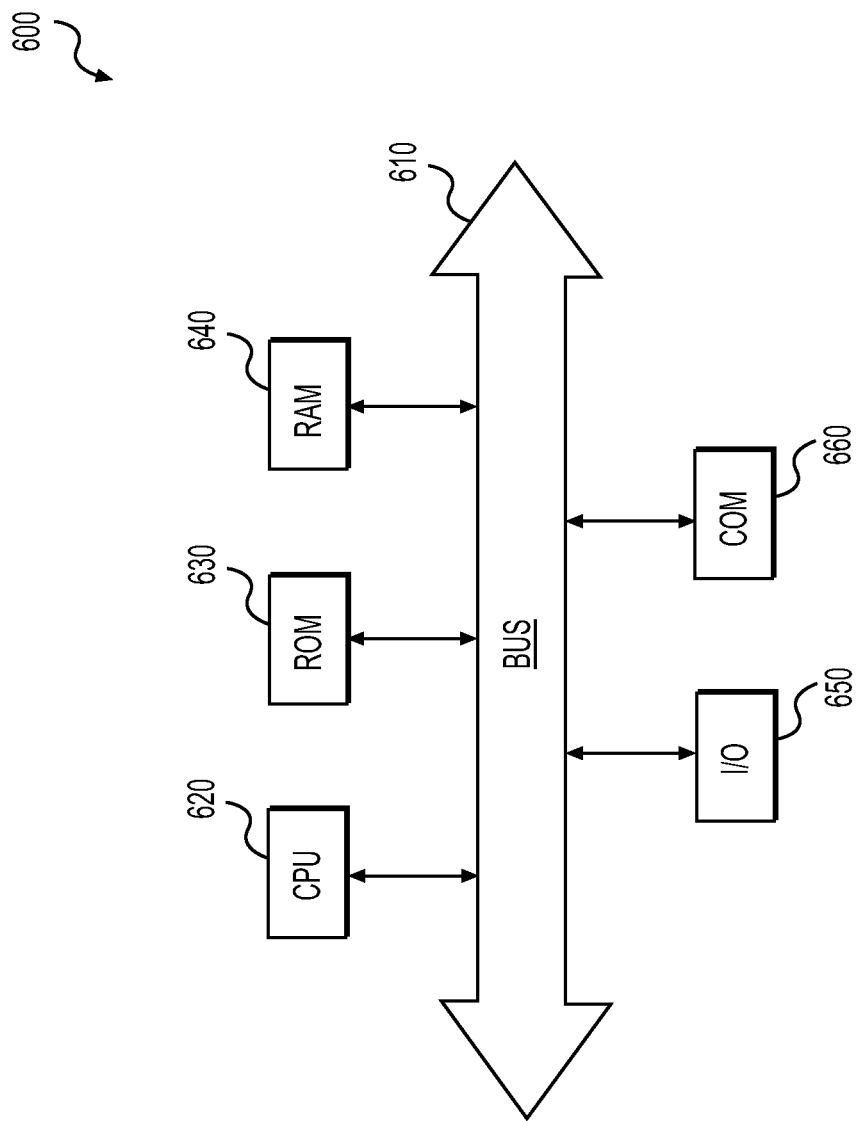
FIG. 6 is a simplified functional block diagram of a computer and/or server that may be configured as a device or system performing privacy friendly online advertising, according to an exemplary embodiment of the present disclosure.

FIG. 6 illustrates a high-level functional block diagram of an exemplary computer system 600, in which embodiments of the present disclosure, or portions thereof, may be implemented, e.g., as computer-readable code. For example, each of the exemplary devices and systems described above with respect to FIG. 1 can be implemented in computer system 600 using hardware, software, firmware, tangible computer readable media having instructions stored thereon, or a combination thereof and may be implemented in one or more computer systems or other processing systems. Hardware, software, or any combination of such may embody any of the modules and components in FIG. 1, as described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-5 may be implemented using computer system 600. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines.

In addition, in some embodiments the order of operations may be rearranged without departing from the spirit of the disclosed subject matter.

As shown in FIG. 6, computer system 600 includes a central processing unit (CPU) 620. CPU 620 may be any type of processor device including, for example, any type of special purpose or a general-purpose microprocessor device. As will be appreciated by persons skilled in the relevant art, CPU 620 also may be a single processor in a multi-core/multiprocessor system, such system operating alone, or in a cluster of computing devices operating in a cluster or server farm. CPU 620 is connected to a data communication infrastructure 610, for example, a bus, message queue, network, or multi-core message-passing scheme.

Computer system 600 also includes a main memory 640, for example, random access memory (RAM), and may also include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into computer system 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 600.

Computer system 600 may also include a communications interface ("COM") 660. Communications interface 660 allows software and data to be transferred between computer system 600 and external devices. Communications interface 660 may include a modem, a network interface (such as an Ethernet card), a communications port, a PCM-CIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of computer system 600, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Computer system 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for protecting user privacy in an online advertising environment, the method comprising:
    receiving, at a host server, data related to user in a first communication session between the host server and a client device;
    generating or receiving, at the host server, a user profile associated with a user;
    encrypting the user profile to produce encrypted user profile data and generating a decryption key for decrypting the encrypted user profile data;
    transmitting the decryption key to the client device, deleting the decryption key from the host server, and ending the first communication session;
    establishing a second communication session between the host server and the client device;
    receiving the decryption key from the client device in the second communication session; and
    providing targeted advertising based in part on decrypting the encrypted user profile data by:
        regenerating the user profile based on decrypting the encrypted user profile data;
        determining a target audience for advertising content; and
        providing targeted advertising based on the target audience and the regenerated user profile.

2. The computer-implemented method of claim 1, further comprising:
    updating, at the host server, the user profile associated with a user during the second communication session;
    encrypting the updated user profile to produce encrypted updated user profile data and generating an updated decryption key for decrypting the encrypted updated user profile data;
    transmitting the updated decryption key to the client device, deleting the updated decryption key from the host server, and ending the second communication session;
    establishing a third communication session between the host server and the client device;
    receiving the updated decryption key from the client device during the third communication session; and
    providing targeted advertising based in part on decrypting the updated encrypted user profile data.

3. The computer-implemented method of claim 1, wherein the data related to user includes one or more of unique identify associated with the user, user demographic data, user behavior, and user preferences.

4. The computer-implemented method of claim 3, wherein the user profile data includes an interest score.

5. The computer-implemented method of claim 4, wherein the interest score is used to provide the targeted advertising.

6. The computer-implemented method of claim 1, wherein ending the first communication session comprises ending all communication based on authentication between the host server and the client device.

7. The computer-implemented method of claim 1, further comprising:
    transmitting a request from the host server to the client device for the decryption key in the second communication session.

8. The computer-implemented method of claim 1, further comprising:
    updating the user profile based on the user's responsiveness to the targeted advertising.

9. A system for protecting user privacy in an online advertising environment, the system comprising:
    a data storage device storing instructions; and
    a processor configured to execute the instructions to perform a method comprising:
    receiving, at a host server, data related to user in a first communication session between the host server and a client device;
    generating or receiving, at the host server, a user profile associated with a user;
    encrypting the user profile to produce encrypted user profile data and generating a decryption key for decrypting the encrypted user profile data;
    transmitting the decryption key to the client device; deleting the decryption key from the host server, and ending the first communication session;
    establishing a second communication session between the host server and the client device;

receiving the decryption key from the client device during the second communication session; and providing targeted advertising based in part on decrypting the encrypted user profile data by:
- regenerating the user profile based on decrypting the encrypted user profile data;
- determining a target audience for advertising content; and
- providing targeted advertising based on the target audience and the user profile.

10. The system of claim 9, wherein the method further comprises:
- updating, at the host server, the user profile associated with a user during the second communication session;
- encrypting the updated user profile to produce encrypted updated user profile data and generating an updated decryption key for decrypting the encrypted updated user profile data;
- transmitting the updated decryption key to the client device; deleting the updated decryption key from the host server, and ending the second communication session;
- establishing a third communication session between the host server and the client device;
- receiving the updated decryption key from the client device during the third communication session; and
- providing targeted advertising based in part on decrypting the updated encrypted user profile data.

11. The system of claim 9, wherein the data related to user includes one or more of unique identify associated with the user, user demographic data, user behavior, and user preferences.

12. The system of claim 11, wherein the user profile includes an interest score.

13. The system of claim 12, wherein the interest score is used to provide the targeted advertising.

14. The system of claim 9, wherein ending the first communication session comprises ending all communication based on authentication between the host server and the client device.

15. The system of claim 9, wherein the method further comprises:
- transmitting a request from the host server to the client device for the decryption key in the second communication session.

16. The system of claim 9, wherein the method further comprises:
- updating the user profile based on the user's responsiveness to the targeted advertising.

17. A non-transitory computer-readable medium storing instructions, the instructions, when executed by a computer system cause the computer system to perform a method, the method comprising:
- receiving, at a host server, data related to user in a first communication session between the host server and a client device;
- generating or receiving, at the host server, a user profile associated with a user;
- encrypting the user profile to produce encrypted user profile data and generating a decryption key for decrypting the encrypted user profile data;
- transmitting the decryption key to the client device, deleting the decryption key from the host server, and ending the first communication session;
- establishing a second communication session between the host server and the client device;
- receiving the decryption key from the client device during the second communication session; and
- providing targeted advertising based in part on decrypting the encrypted user profile data by:
  - regenerating the user profile based on decrypting the encrypted user profile data;
  - determining a target audience for advertising content; and
  - providing targeted advertising based on the target audience and the user profile.

18. The non-transitory computer-readable medium of claim 17, wherein the method further comprises:
- updating, at the host server, the user profile associated with a user during the second communication session;
- encrypting the updated user profile to produce encrypted updated user profile data and generating an updated decryption key for decrypting the encrypted updated user profile data;
- transmitting the updated decryption key to the client device;
- deleting the updated decryption key from the host server and ending the second communication session;
- establishing a third communication session between the host server and the client device;
- receiving the updated decryption key from the client device during the third communication session; and
- providing targeted advertising based in part on decrypting the updated encrypted user profile data.

* * * * *